US011988411B2

(12) United States Patent
Barnhart et al.

(10) Patent No.: US 11,988,411 B2
(45) Date of Patent: May 21, 2024

(54) INLINE HEATER

(71) Applicant: Tom Richards, Inc., Willoughby, OH (US)

(72) Inventors: David R. Barnhart, Jefferson, OH (US); Howard J. Base, Macedonia, OH (US); Dale A. Smith, Montville, OH (US)

(73) Assignee: Tom Richards, Inc., Willoughby, OH (US)

( * ) Notice: Subject to any disclaimer, the term of this patent is extended or adjusted under 35 U.S.C. 154(b) by 342 days.

(21) Appl. No.: 17/386,435

(22) Filed: Jul. 27, 2021

(65) Prior Publication Data

US 2022/0034549 A1 Feb. 3, 2022

Related U.S. Application Data

(60) Provisional application No. 63/058,280, filed on Jul. 29, 2020.

(51) Int. Cl.
*F24H 1/10* (2022.01)
*F24H 9/14* (2006.01)
(Continued)

(52) U.S. Cl.
CPC ............ *F24H 1/102* (2013.01); *F24H 9/146* (2013.01); *F28F 1/00* (2013.01); *F28F 9/005* (2013.01);
(Continued)

(58) Field of Classification Search
None
See application file for complete search history.

(56) References Cited

U.S. PATENT DOCUMENTS 1,162,537 A * 11/1915 Yager ...................... F24H 1/162 123/549
1,534,898 A * 4/1925 Bluemlein ................ F24H 1/16 392/481

(Continued)

FOREIGN PATENT DOCUMENTS

WO WO 01/02108 A1 1/2001
WO WO 2013/189869 A1 12/2013
WO WO 2019/148785 A1 8/2019

OTHER PUBLICATIONS

International Search Report dated Oct. 28, 2021 for International application No. PCT/US2021/043330.

(Continued)

*Primary Examiner* — Thor S Campbell
(74) *Attorney, Agent, or Firm* — BENESCH, FRIEDLANDER, COPLAN & ARONOFF LLP

(57) ABSTRACT

An inline heater includes a heater core that includes a heat spreader assembly comprising a tubular heat spreader that extends axially along a longitudinal axis and that comprises an external surface. The heat spreader assembly includes a fluid inlet and a fluid outlet. At least one conduit extends helically about the longitudinal axis of the heat spreader between the fluid inlet and the fluid outlet to define a fluid heating flow path that fluidically connects the fluid inlet and the fluid outlet. The heat spreader assembly further comprising an electrically operated heating element for heating the heat spreader.

25 Claims, 7 Drawing Sheets

(51) Int. Cl.
*F28F 1/00* (2006.01)
*F28F 9/00* (2006.01)
*H05B 3/40* (2006.01)

(52) U.S. Cl.
CPC ........... *H05B 3/40* (2013.01); *F24H 2250/02* (2013.01); *H05B 2203/013* (2013.01); *H05B 2203/021* (2013.01); *H05B 2203/033* (2013.01)

(56) References Cited

U.S. PATENT DOCUMENTS

| | | | | |
|---|---|---|---|---|
| 1,615,166 | A * | 1/1927 | Cowles | F24H 1/162 392/481 |
| 3,551,641 | A * | 12/1970 | Andrew | F24H 1/162 604/113 |
| 3,584,194 | A * | 6/1971 | Kautz | B05B 9/002 392/494 |
| 3,835,294 | A * | 9/1974 | Krohn | F24H 1/121 392/494 |
| 4,199,675 | A * | 4/1980 | Sharpless | F24H 1/121 392/494 |
| 4,465,922 | A * | 8/1984 | Kolibas | F24H 1/121 392/494 |
| 4,480,172 | A * | 10/1984 | Ciciliot | H05B 3/42 261/142 |
| 4,797,089 | A * | 1/1989 | Schubach | F23N 1/002 431/208 |
| 5,919,386 | A * | 7/1999 | James | H05B 3/82 219/544 |
| 6,577,817 | B2 * | 6/2003 | Harris | F24H 7/0433 392/479 |
| 6,804,965 | B2 * | 10/2004 | Abras | F25B 21/02 165/184 |
| 7,286,752 | B2 * | 10/2007 | Gourand | H05B 3/262 392/479 |
| 7,565,065 | B2 * | 7/2009 | Kato | F24H 1/102 392/311 |
| 7,756,404 | B2 * | 7/2010 | Schubert | F28D 7/026 392/484 |
| 8,180,207 | B2 * | 5/2012 | Shirai | F24H 15/37 392/491 |
| 8,670,656 | B2 * | 3/2014 | Nishida | F24H 9/2028 392/483 |
| 9,516,971 | B2 * | 12/2016 | Klein | A47J 31/542 |
| 9,562,703 | B2 | 2/2017 | Base et al. | |
| 9,975,402 | B2 * | 5/2018 | Pierron | F24H 9/0015 |
| 10,132,525 | B2 * | 11/2018 | Klein | F24H 1/102 |
| 11,402,124 | B2 * | 8/2022 | Okabe | F24H 1/162 |
| 2010/0215351 | A1 * | 8/2010 | Forrester | A61M 16/0875 392/481 |
| 2013/0202279 | A1 * | 8/2013 | Reichl | F24H 1/142 392/480 |
| 2017/0328651 | A1 | 11/2017 | Rozga et al. | |
| 2019/0323728 | A1 * | 10/2019 | Base | F28F 1/40 |
| 2020/0018519 | A1 | 1/2020 | Okabe et al. | |

OTHER PUBLICATIONS

Written Opinion of the International Searching Authority dated Oct. 28, 2021 for International application No. PCT/US2021/043330.

* cited by examiner

INLINE HEATER

CROSS-REFERENCE TO RELATED APPLICATION

This application claims priority from and benefit of the filing date of U.S. provisional patent application Ser. No. 63/058,280 filed Jul. 29, 2020, and the entire disclosure of said provisional application is hereby expressly incorporated by reference into the present specification.

BACKGROUND

Inline heaters are well known and in widespread commercial use. Examples of such heaters and their uses are disclosed in U.S. Pat. No. 9,562,703 and U.S. Patent Application Publication No. 2019/0323728. Despite the success of the inline heaters such as those disclosed in U.S. Pat. No. 9,562,703 and U.S. Patent Application Publication No. 2019/0323728, a need has been identified for a new and improved inline heater that provides superior overall performance and advantages for certain applications, including improved heating efficiency, explosion resistance, improved flow-through rate, improved purge function, and/or improved design of the inlet and outlet fittings and their connection to the heater assembly.

SUMMARY

In accordance with one aspect of the present disclosure, an inline heater includes a heater core that includes a heat spreader assembly comprising a tubular heat spreader that extends axially along a longitudinal axis and that comprises an external surface. The heat spreader assembly includes a fluid inlet and a fluid outlet. At least one conduit extends helically about the longitudinal axis of the tubular heat spreader between the fluid inlet and the fluid outlet to define a fluid heating flow path that fluidically connects said fluid inlet and said fluid outlet. The heat spreader assembly further comprising an electrically operated heating element for heating the tubular heat spreader.

In accordance with another aspect of the present disclosure, a heat spreader assembly for a liquid heater comprises a tubular heat spreader that extends axially along a longitudinal axis and that comprises an external surface. At least one conduit extends helically about the longitudinal axis of the heat spreader. A fluid inlet and a fluid outlet are provided and are fluidically connected by the at least one conduit such that a fluid heating flow path is defined by the at least one conduit between the fluid inlet and the fluid outlet. An electrically operated heating element is provided for heating the heat spreader. The heat spreader includes at least one heat transfer channel that extends helically about the external surface, wherein the at least one conduit is seated in the at least one heat transfer channel. The least one heat transfer channel includes opposite first and second side walls and bottom wall, wherein the at least one conduit is in contact with the first and second side walls and said bottom wall. A purge manifold externally covers the heat spreader and closes the at least one heat transfer channel such that purge passages are defined between the channel walls and the purge manifold around the at least one conduit.

DETAILED DESCRIPTION OF THE PRESENT INVENTION

Figure 1:
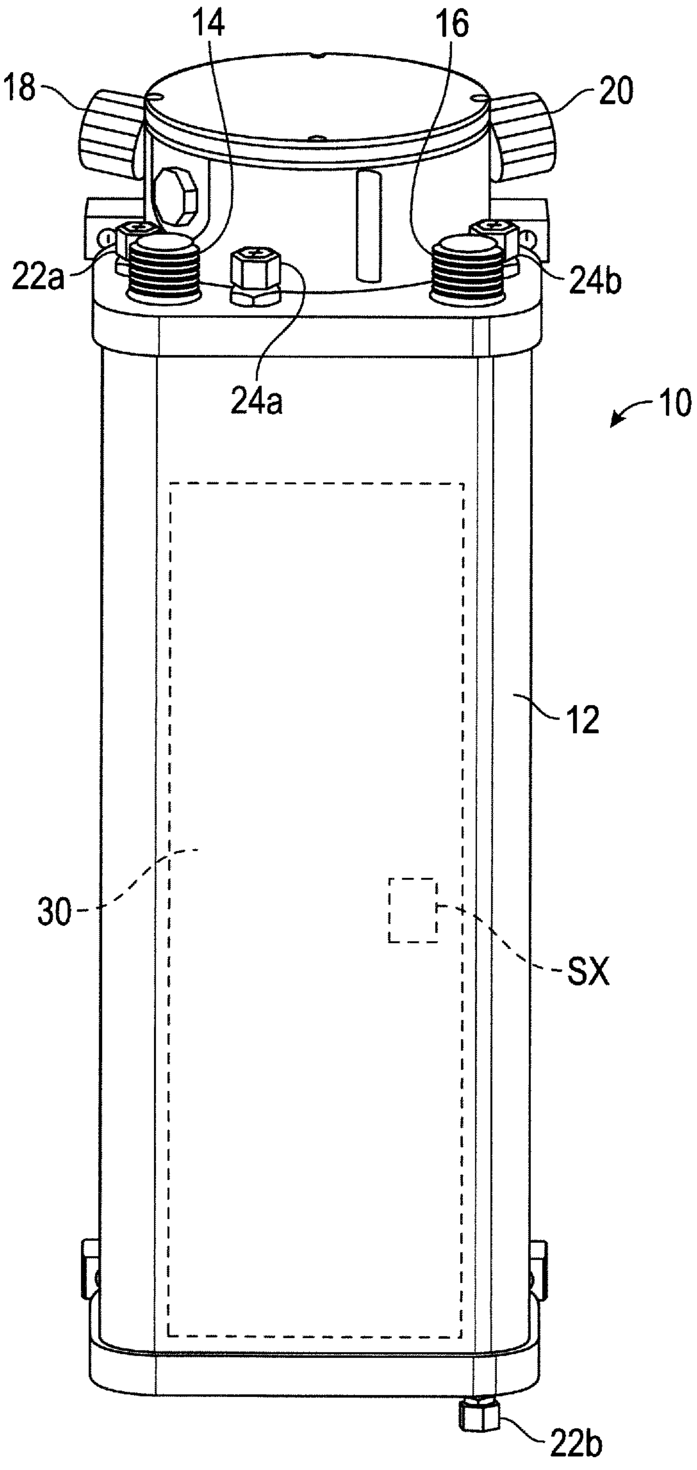
FIG. 1 shows one example of an inline heater provided in accordance with an embodiment of the present disclosure.

FIG. 1 shows an inline heater 10 provided in accordance with an embodiment of the present invention. The heater 10 preferably comprises an enclosure 12 that contains a heater core assembly 30 although the enclosure 12 can optionally be omitted in certain embodiments. The enclosure 12 can be metallic (aluminum, stainless steel or other) or can be polymeric such as PTFE (polytetrafluoroethylene) or another polymer. The heater 10 includes a process liquid inlet 14 that receives a supply of a chemical or other liquid to be heated and a process liquid outlet 16 for dispensing the liquid that is heated by the heater 10. The heater 10 includes a power wire fitting 18 for operably mating with a source of electrical power to drive the heating element(s) of the heater core assembly 30 and includes a sensor wire fitting 20 for operably mating with an external control device or control system that receives sensor output data from one or more sensors SX located in the enclosure 12 such as one or more temperature sensors that sense the temperature of the heater element, the liquid being heated, and/or other components or contents of the heater core or sensors such as liquid flow sensors or pressure sensors that sense the presence or flow rate or pressure of liquid and/or purge gas and that each output a signal that varies in relation to such sensed condition.

The enclosure 12 further comprises at least one purge gas inlet for introducing a purge gas into the heater 10 and at least one purge gas outlet for exhausting purge gas from the heater 10. In the illustrated embodiment, the heater 10 comprises first and second purge gas inlets 22*a*,24*a* for mating with a supply of purge gas such as nitrogen (N2) or other purge gas and comprises first and second purge gas outlets 22*b*,24*b* that are in respective fluid communication with the first and second purge gas inlets 22*a*,24*a* and through which the purge gas is exhausted from the heater 10. The first purge gas inlet 22*a* and the first purge gas outlet 22*b* are in fluid communication through a first purge gas flow path that flows through the enclosure 12 such that the purge gas flowing between the first purge gas inlet 22*a* and first purge gas outlet 22*b* flushes undesirable residual gases that may be corrosive, explosive, or otherwise detrimental from the enclosure 12. Similarly, the second purge gas inlet 24*a* and second purge gas outlet 24*b* are in fluid communication through a second purge gas flow path that flows through the heater core assembly 30 such that the purge gas flowing between the second purge gas inlet 24*a* and second purge gas outlet 24*b* flushes undesirable residual gases that may be corrosive, explosive, or otherwise detrimental from the heater core.

Figure 2:
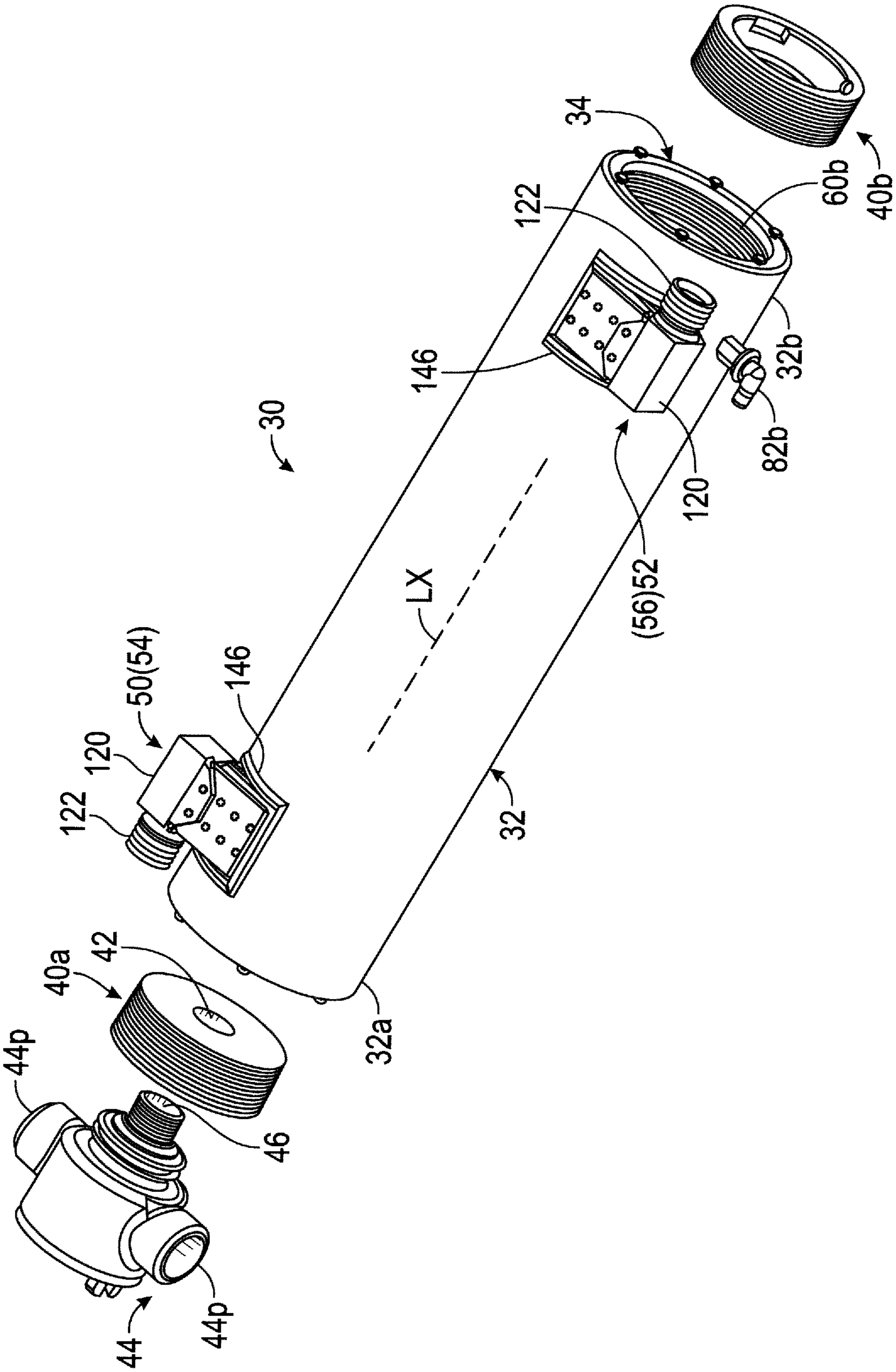
FIG. 2 provides a partially exploded isometric view of a heater core assembly according to an embodiment of the present disclosure.

A partially exploded perspective view of the heater core assembly (also referred to as a "heater core") 30 is provided in FIG. 2. The heater core 30 comprises a heat spreader assembly 32 that is generally an elongated tubular structure that extends along a longitudinal axis LX between opposite first and second axial ends 32*a*,32*b*. As shown herein, the heat spreader assembly 32 comprises a tubular heat spreader body 60 (see also FIG. 3) that can comprise a circular or otherwise shaped inside diameter and a circular or otherwise shaped outside diameter and that includes a hollow core 34 (see also FIGS. 2A & 3) that defines an internal space 34S that opens through the opposite first and second axial ends 32*a*,32*b*. Alternatively, the heat spreader assembly 32 is ovalized, polygonal, or otherwise shaped externally or internally.

The heat spreader assembly 32 also comprises first and second end plugs 40*a*,40*b* that are respectively threaded into or otherwise connected to and seal the opposite first and second open ends 32*a*,32*b* of the heat spreader assembly 32. The first and second end plugs 40*a*,40*b* can be metal or non-metallic such as rubber. Preferably, the second end plug 40*b* is completely solid and blocks the second open end 32*b*, while the first end plug 40*a* includes a central aperture 42 that extends there through (see also FIG. 2A). A sealed junction box 44 includes a neck 46 that is threadably or otherwise mated with the central aperture 42 of the first end plug 40*a* such that the sealed junction box 44 communicates with the internal space 34S of the heat spreader assembly 32. The sealed junction box 44 includes one or more conductor passages 44*p* that allow power and or data conductors to be passed through the junction box 44 into the internal space 34S as required to supply electrical power and/or control signals into the internal space 34S and as required to transmit sensor data and/or control signals out of the internal space 34S. When the enclosure 12 is provided, the conductor passages 44*p* allow electrical conductors extending therethrough to operably connect with the power wire fitting 18 and the sensor wire fitting 20. The internal space 34S is thus at least substantially sealed by the first and second end plugs 40*a*,40*b* and the junction box 44 to provide explosion resistance to the heater core assembly 30.

The heat spreader assembly 32 includes first and second fluid manifold fittings 50,52 that are in fluid communication with each other by way of a fluid heating flow path comprising one or more tubular conduits C1,C2,C3 (described further below in relation to FIG. 3A) that extend through the heat spreader assembly 32 and define a fluid heating flow path that can be helical and/or otherwise defined. In one embodiment, one or a plurality of polymeric tubes C1,C2,C3 such as PTFE (polytetrafluoroethylene) or other tubes such as metallic tubes extend between and fluidically interconnect the first and second manifold fittings 50,52 to provide the heating flow path that extends along and that is thermally engaged with the heat spreader assembly. The first and second manifold fittings 50,52 are connected respectively to the opposite ends of the tubular conduits C1,C2,C3 and, thus, one of the first and second manifold fittings 50,52 functions as a heat spreader fluid inlet 54 (the first manifold fitting 50 in the present example) and the other of the first and second manifold fittings 50,52 functions as a heat spreader fluid outlet 56 (the second manifold fitting 50 in the present example) such that liquid flowing from the heat spreader inlet 54 to the heat spreader outlet 56 by way of the heating flow path is heated within the heat spreader assembly 32. The flow direction of the heating flow path can be reversed such that the manifold fittings 50,52 respectively serve as the heat spreader outlet and inlet 56,54. When the enclosure 12 is provided, the process liquid inlet 14 is connected in fluid communication with the heat spreader inlet 54 and the process liquid outlet 16 is connected in fluid communication with the heat spreader outlet 56.

Figure 3:
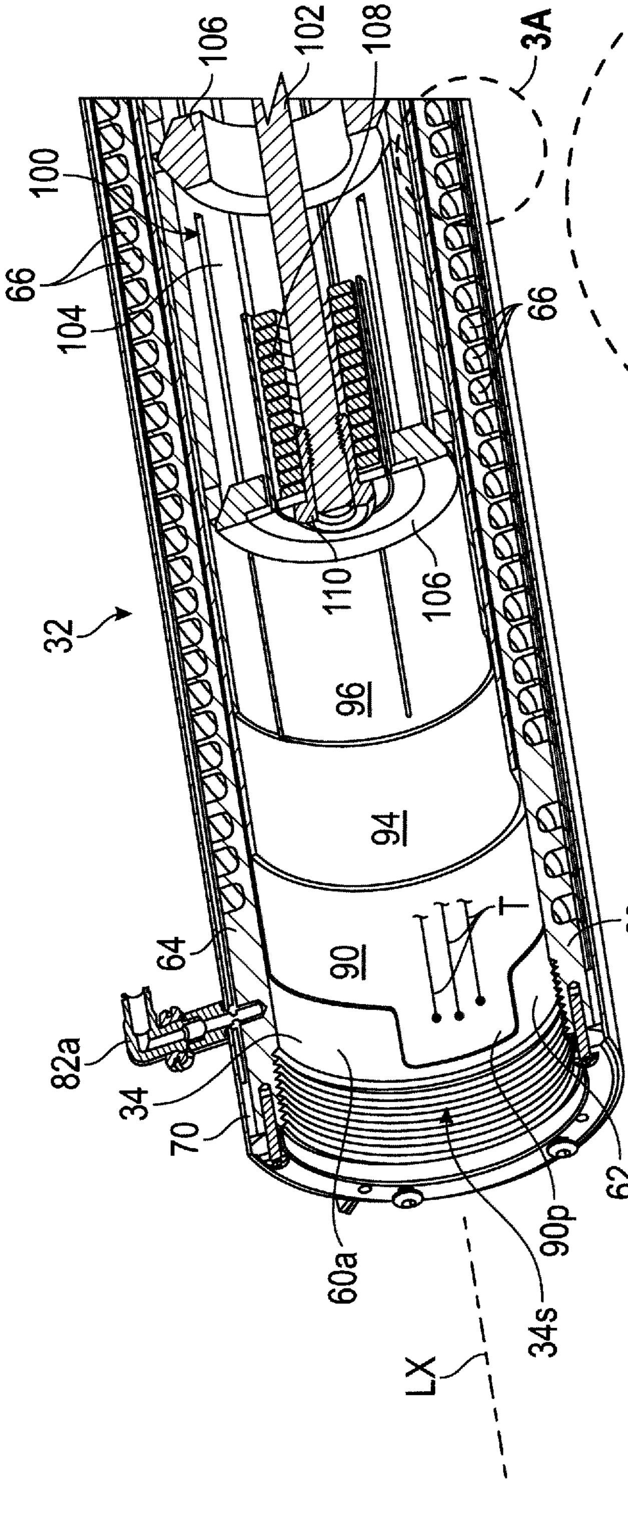
FIG. 3 is a partial isometric section view of a heat spreader assembly in accordance with an embodiment of the present development.
Figure 3A:
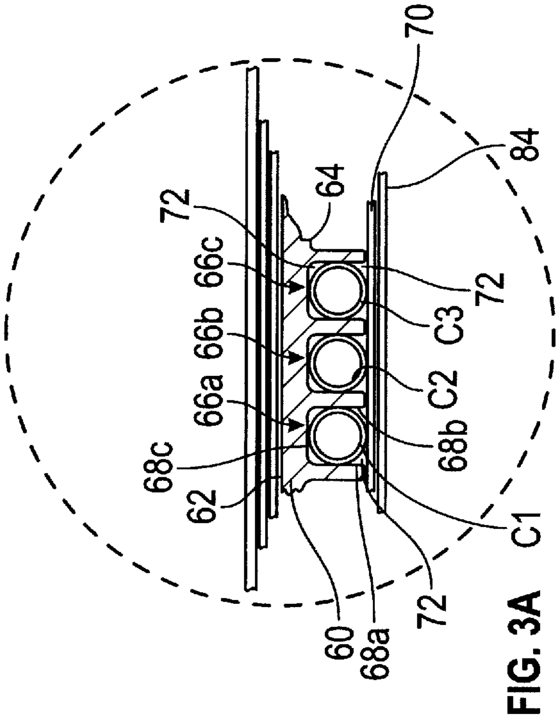
FIG. 3A is a greatly enlarged view of Detail 3A of FIG. 3.

FIG. 3 that provides a section view of the heat spreader assembly 32 (note that in FIG. 3, except for the heating element 90, the components and structures located in the internal space 34S are shifted progressively and axially to the right to reveal their radial positions relative to each other whereas in their operative positions they are axially aligned with the heating element 90). As shown in FIG. 3 and FIG. 3A, the illustrated embodiment of the heat spreader assembly 32 comprises a hollow cylindrical tubular heat spreader body or member 60 defined from aluminum or another thermally conductive metal or non-metallic material. The inside surface 62 of the heat spreader 60, which is cylindrical in the illustrated embodiment and forms an inside diameter, defines the hollow internal space 34S. The insider surface 62 can alternatively be defined with a non-cylindrical cross-section such as with a polygonal, oval, or otherwise shaped cross-section. The opposite open ends 32*a*,32*b* of the heat spreader assembly 32 are respectively defined by the opposite open ends 60*a*,60*b* of the heat spreader body 60.

An external surface 64 of the heat spreader body 60 can be cylindrical or otherwise shaped and comprises at least one heat transfer channel 66 that extends helically about the longitudinal axis LX such that the at least one heat transfer channel 66 extends axially along and helically about the longitudinal axis LX. The single or each heat transfer channel 66 comprises and is defined between opposite first and second side walls 68*a*,68*b* and bottom wall 68*c* defined by or otherwise connected to the external surface 64 of the heat spreader 60. In the illustrated example, the heat spreader 60 comprises a plurality of helical heat transfer channels such as three helical channels 66*a*,66*b*,66*c* that are nested with respect to each other so as to define a multi-helix (triple-helix) structure comprising three helical channels 66*a*,66*b*,66*c* coaxially arranged about the longitudinal axis LX and axially offset or translated with respect to each other. The multi-helix channel structure 66 can comprise two, three, or more helical channels 66*a*,66*b*,66*c* so arranged, or a single helical channel 66 can be used.

With particular reference to FIG. 3A, the first, second, and third fluid polymeric conduits C1,C2,C3 (generally conduits "C") that together define the fluid heating flow path are respectively seated in the first, second, and third helical channels 66*a*,66*b*,66*c* of the heat spreader 60 and are in contact with the opposite side walls 68*a*,68*b* and bottom wall 68*c* of the respective channel so as to each be thermally engaged with the heat spreader 60 such that heat is transferred into the conduits C1,C2,C3 and into the fluid carried in the conduits from heat spreader 60 and, in particular, from the side walls 68*a*,68*b* and bottom wall 68*c* of the helical channels 66. Thus, in the illustrated example, the multiple conduits C1,C2,C3 are respectively located in and extend along said multiple heat transfer channels 68*a*,68*b*,68*c*. In one embodiment, the conduits C are defined from a chemically resistant polymer such as PTFE (polytetrafluoroethylene), but other polymers can be used, or metal tubing can be used such as stainless steel or other metal tubing. The channels 66 (66*a*,66*b*,66*c*) open outwardly and thus each comprise an open outer end on the side opposite the bottom wall 68*c*. The helical pitch of the channel 66 or channels 66*a*,66*b*,66*c* can be constant along the longitudinal axis LX and along their entire axial length but, preferably, the pitch of the channel(s) 66 varies over the longitudinal axis LX and over their axial length, which variation can be smooth and continuous or a single discrete change. In one example, a first pitch is used for a central region of the heat spreader body 60 (where the channel(s) 66 and conduits C1,C2,C3 surround the heating element 90 to improve heat transfer into the conduits C1,C2,C3), a second, larger pitch is used adjacent the opposite axial ends of the heat spreader body 60 near the opposite axial ends of the channel(s) 66, and the opposite terminal ends of each channel 66 can extend purely circumferentially with zero axial pitch for a partial or a complete turn about the axis LX to facilitate mating of the tubular conduits C1,C2,C3 with the first and second manifold fittings 50,52 as described in more detail below.

A purge manifold 70 (shown by itself in FIG. 4) externally covers the heat spreader 60 and closes the open outer ends of the channels 66 and preferably also compresses the conduits C1,C2,C3 into intimate contact with the side walls 68*a*,68*b* and bottom wall 68*c*. Purge passages 72 (FIG. 3A) are defined between the conduits C1,C2,C3 and the channel walls 68*a*,68*b*,69*c* and purge manifold 70 and these passages 72 extend helically coextensively along the conduits C1,C2, C3 and channels 66. These purge passages 74 collect vapors and any other residual compounds that permeate outwardly through the walls of the conduits C1,C2,C3 and the purge passages 74 are flushed with nitrogen or another purge gas to flush the chemical vapors therefrom.

Figure 4:
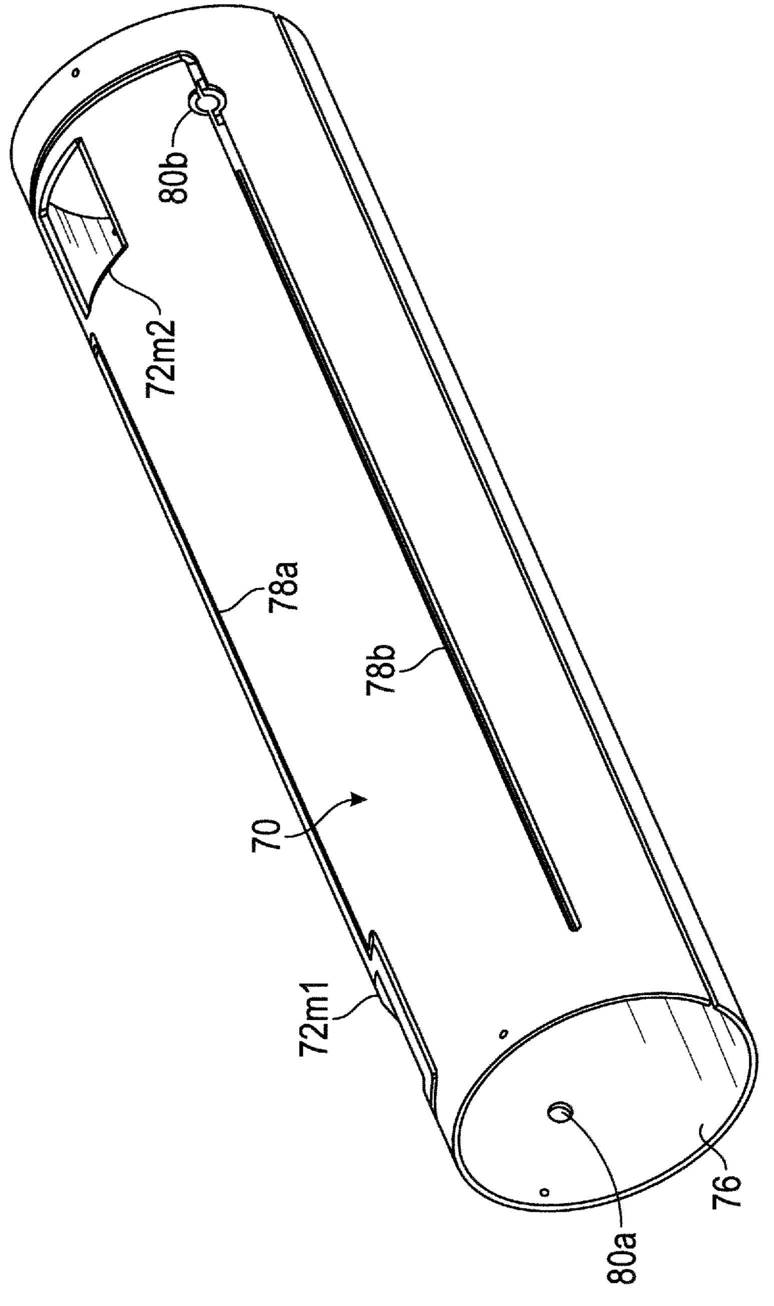
FIG. 4 is an isometric view of a purge manifold portion of the heater core assembly.

In the illustrated embodiment, as shown in FIG. 4, the purge manifold 70 can comprise a cylindrical aluminum body 76 that includes first and second axially extending purge distribution channels 78*a*,78*b* defined therein and that each include an open slit that extends along its length. The purge distribution channels 78*a*,78*b* are thus in fluid communication with the purge passages 74 of the helical channels 66 through the slits defined in the purge distribution channels 78*a*,78*b*. The purge manifold 70 includes a purge gas inlet orifice 80*a* that intersects and is in fluid communication with the first purge distribution channel 78*a* and includes a purge gas outlet orifice 80*b* that intersects and is in fluid communication with the second purge distribution channel 78*b*. Purge gas inlet and outlet fittings 82*a*,82*b* are inserted respectively in the purge gas inlet and outlet orifices 80*a*,80*b* and are threaded into or otherwise connected to the heat spreader 60. The purge gas fittings 82*a*,82*b* include radial flow passages or other flow passages that are in fluid communication with the purge gas inlet and outlet orifices 80*a*,80*b* and the distribution channels 78*a*,78*b*. As such, a pressurized purge gas introduced into the purge gas inlet orifice 80*a* via inlet fitting 82*a* will travel through the first purge distribution channel 78*a*, into and through the purge passages 74 of the heat spreader 60, outwardly into the second purge distribution channel 78*b*, and then to the purge gas outlet orifice 80*b* where the purge gas is exhausted through the outlet fitting 82*b*. The purge manifold 70 is preferably externally covered by an outer wrap 84 such as a PTFE covering, a metallic covering, and/or any other material layer(s) that cover(s) the purge distribution channels 78*a*,78*b* to enclose same so that they can receive and transmit purge gas as described. If provided, the enclosure 12 covers the outer wrap 84 and the second purge gas inlet 24*a* and the second purge gas outlet 24*b* are respectively fluidically connected to the purge gas inlet and outlet fittings 82*a*,82*b*. The content of the exhausted purge gas can be monitored and tested to assess the health of the heater 10. For example, if the exhausted purge gas contains chemical vapors above a select concentration, that can be indicative of degradation or a leak in the conduits C1,C2,C3 and or a loose connection between one of the conduits C1,C2,C3 and one of the manifold fittings 50,52 which can indicate the need to repair or replace the heater 10.

The heat spreader assembly 32 comprises at least one electrical heating element 90 connected to the heat spreader 60 and thermally engaged or thermally coupled with the heat spreader 60 for heating the heat spreader 60 such that the heat spreader 60 heats liquid flowing in the one or more conduits C1,C2,C3. In the illustrated embodiment, the heating element 90 comprises a thin film heater element is located in the internal space 34S and preferably is in intimate contact with and may extend completely circumferentially around the inside surface/inside diameter of the heat spreader and axially along at least a substantial majority of the heat spreader 60 to heat the heat spreader 60. Additionally or alternatively, a heater element such as the thin film heater element 90 or any other suitable heating device such as a resistance heating coil can be installed and located externally relative to the space 34S such as externally surrounding the purge manifold layer 70 and/or externally surrounding the outer wrap layer 84 or elsewhere outside the internal space 34S and externally surrounding and connected to the heat spreader 60 to be thermally engaged/coupled with and adapted to heat the heat spreader 60. When the only heating element 90 is provided in the space 34S as shown herein, the heater 10/heat spreader assembly 32 provides explosion resistance since the space 34S is sealed at its opposite ends by the first and second end plugs 40*a*,40*b*.

Figure 2A:
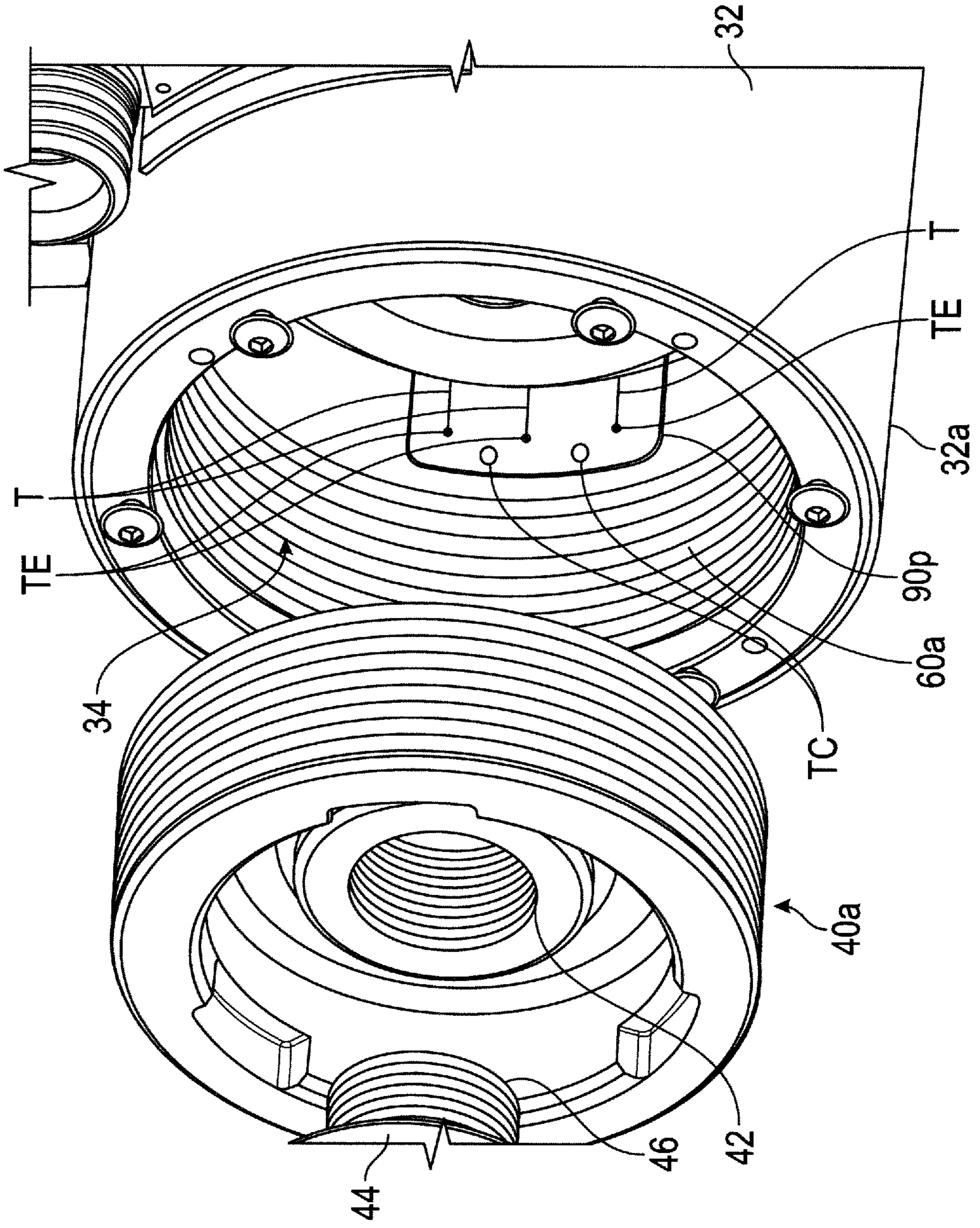
FIG. 2A is a partial exploded view of one end of the heater core assembly of FIG. 2.

The heat spreader assembly 32 further comprises a compliant PTFE outer load spreader 94 located radially inward from the heating element 90 that extends axially circumferentially coextensively with the heating element 90 and also comprises a semi-rigid aluminum, stainless steel, or other metallic inner load spreader 96 located radially inward from the PTFE load spreader 94 and that extends axially and circumferentially coextensively with the heating element 90 and the outer load spreader 94. The outer and inner load spreaders 94,96 continuously urge and maintain the heating element 90 radially outward in contact with the heat spreader 60 to ensure efficient heat transfer from the heater element 90 into the heat spreader 60. The thin film heater element 90 can comprise multiple layers of a substrate such as PTFE impregnated fiberglass and comprises one or more electrically conductive heating traces that extend between layers of the substrate. In one example as shown in FIG. 2A, the heater element 90 comprises a 3-phase heater element including 3 three heating traces T that each include an electrical connection TE located on a pad 90*p* of the heater element 90 that projects outwardly from the heater element 90 so as not to be engaged by the load spreaders 94,96. A thermocouple or multiple thermocouples TC can be located on or adjacent the pad 90*p* and located on or adjacent one or more of the heating trace electrical connections TE to sense an overheat condition of the heating trace T. Each thermocouple TC can be operably connected to a control system or device through the sensor wire fitting 20 so that the heater element 90 can be deactivated for at least a period of time to allow for cooling to take place.

Additionally, a collet assembly 100 extends coaxially within the space 34S. The collet assembly includes a spring rod 102 that extends through a tubular collet body 104 defined from aluminum or another metal that includes a plurality of axially extending slots or other openings such that the collet body 104 is selectively radially expandable to urge the load spreaders 94,96 radially outward. More particularly, the collet assembly 100 includes two or more collet sleeves or rings 106 that are engaged with the tubular collet body 104 and that are coaxially positioned on and engaged with the spring rod 102. The collet rings 106 include tapered outer surface that are engaged with the collet body 104. A spring 108 is also coaxially positioned on about the spring rod 102 and an adjustment nut 110 is threaded onto the spring rod 102 and is engaged with one of the collet rings 106. When the nut 110 is advanced onto the spring rod 102, the spring 108 is partially compressed and at least two of the collet rings 106 are urged toward each other and such that their respective tapered outer surfaces urge the collet body 104 radially outward into firm abutment with the inner load spreader 96 to ensure that the heater element 90 is pressed and held in intimate contact with the heat spreader 60. The use of multiple, axially spaced-apart collet rings 106 ensures that the radially loading on the collet body 104 (and thus the heater element 90) is uniform along its axial length. The spring 108 accommodates thermal expansion and contraction of the collet assembly 100 to ensure that the radially outward force provided by the collet assembly 100 is maintained as the temperature of the heat spreader assembly 32 varies during use.

Figure 5:
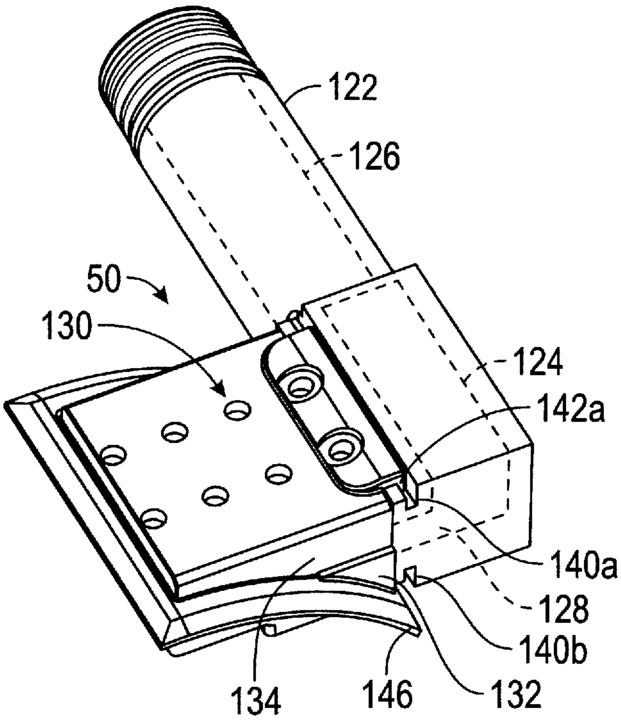
FIGS. 5 & 6 are top and bottom views, respectively, of a purge manifold of the heater core assembly.
Figure 6:
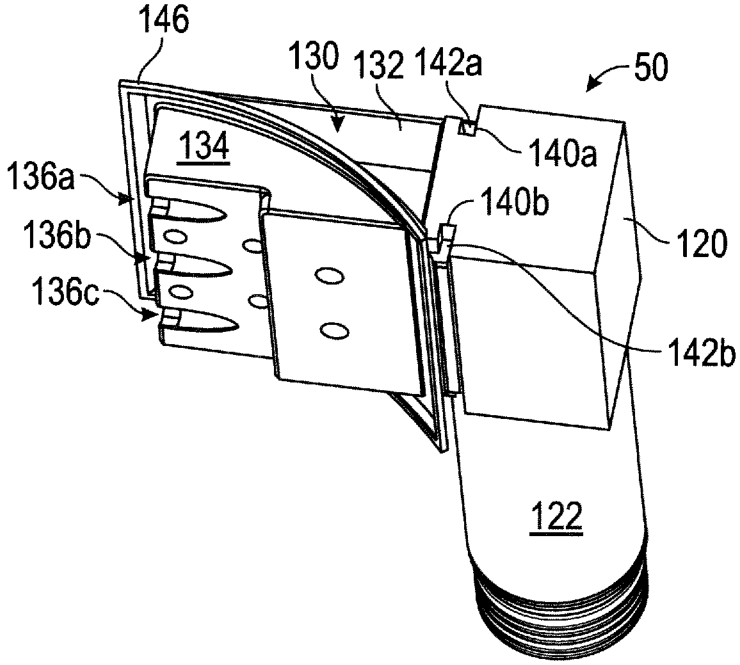
Figure 7:
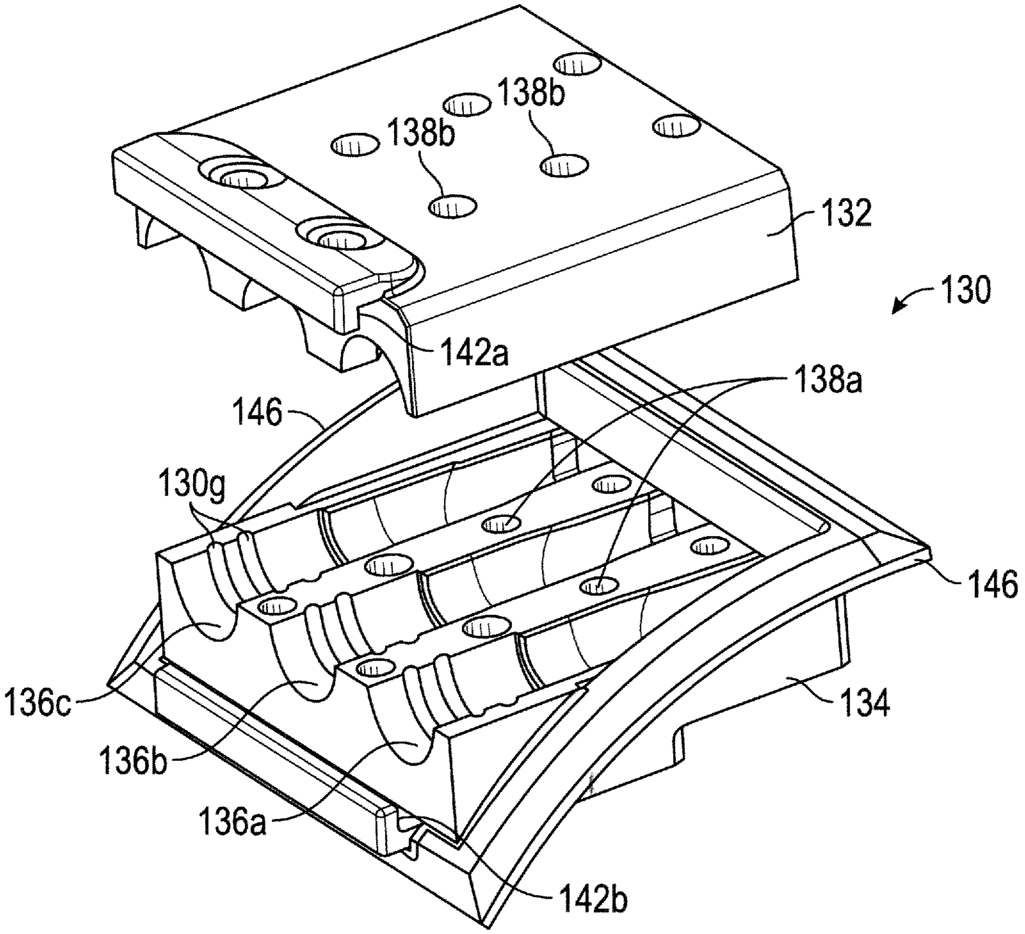
FIG. 7 is an exploded isometric view of the purge manifold shown in FIGS. 5 & 6.

The first and second manifold fittings 50,52 are described in further detail with reference to FIGS. 5-7. In the illustrated embodiment, the first and second manifold fittings 50,52 are identical (but they need not be) so only the first manifold fitting 50 is shown in FIGS. 5-7. The manifold fitting 52 comprises a polymeric manifold piece 120 that comprises a manifold pipe 122 connected thereto. The manifold piece 120 and manifold pipe 122 can be defined together as a one-piece structure or the manifold pipe can be connected to the manifold piece. In either case, the manifold piece 120 and/or pipe 122 can be defined from a polymer such as PTFE or from stainless steel, aluminum, or another metal, and they need not be made of the same material. A support block assembly 130 can be made from aluminum or another metal and is connected to the manifold piece 120 and comprises an upper support block 132 and a lower support block 134, each preferably made from aluminum, stainless steel or another metal but either can alternatively be made from PTFE or another polymer. The support block assembly 130 operatively connects the liquid conduits C1,C2,C3 with the manifold piece 120 such that the conduits C1,C2,C3 are in fluid communication with the manifold piece 120. In particular, the manifold piece 120 comprises an internal primary flow passage 124 that is in fluid communication with an internal flow passage 126 of the manifold pipe 122. The manifold piece 120 also comprises one or more secondary flow passages 128 that each communicate with the primary flow passage 124 and that each communicate with at least one and preferably a respective support block flow passage 136 (136*a*,136*b*,136*c*). The multiple support block flow passages 136*a*,136*b*,136*c* are adapted to receive and retain the respective open ends of one the conduits C1,C2,C3 to be in fluid communication therewith. In one embodiment, as shown in of FIG. 7, the upper and lower support blocks 132,143 are selectively separated such that the conduits C1,C2,C3 can be located in the respective support block flow passages, after which the upper and lower support blocks 132,143 are connected to sealingly capture the conduits ends in the support block flow passages 136. The support block assembly 130 includes one or more seal retaining grooves 130*g* located in each of the support block flow passages 136 for operably retaining a seal such as an O-ring seal or the like that fluidically seals the conduits C1-C3 to the support block assembly 130 to prevent leakage of the liquid being heated. Although not required, in one preferred embodiment, the number of helical channels 66*a*, 66*b*,66*c* and conduits C1,C2,C3 corresponds to the number of support block flow passages 136 (136*a*,136*b*,136*c*) and preferably also corresponds to the number of secondary flow passages 128 of the manifold piece 120. The upper and lower support blocks 132,134 can be connected together using fasteners or any other suitable connecting structure such as interfitting components provided respectively on the upper and lower support blocks 132,134. As shown herein one of the support blocks 132,134 includes a plurality of tapped bores 138*a*, and the other support block 132,134 includes untapped bores 138*b* that are registered with the tapped bores 138*a* such that screws can be respectively installed in the aligned bores 138*a*,138*b* to fixedly secure the upper and lower support blocks to each other.

The support block assembly 130 can be operably connected to the manifold piece 120 using any suitable connection. In the present embodiment shown herein, the manifold piece 120 comprises first and second retaining grooves 140*a*,140*b* and the support block assembly comprises first and second retaining flanges 142*a*,142*b* that are adapted for selective receipt in the first and second retaining grooves 140*a*,140*b*, respectively. In the present embodiment, the first and second retaining flanges 142*a*,142*b* are provided respectively on the upper and lower support blocks 132,134 such that they can be moved apart from each other when the upper and lower support blocks are disconnected as shown in FIG. 7 and such that they can be moved to and retained in the operative position shown in FIGS. 5 and 6 when the upper and lower support blocks 132,143 are connected together. This allows the first and second retaining flanges 142*a*,142*b* to be respectively inserted and installed in the retaining grooves 140*a*,140*b* when the upper and lower support blocks 132,143 are disconnected such that the manifold piece 120 is captured to the support block assembly when the upper and lower support blocks 132,143 are connected together.

The purge manifold 70 (FIG. 4) comprises first and second manifold installation openings 72*m*1,72*m*2 that provide access to the underlying helical channels 66 and conduits C1,C2,C3 of the heat spreader. The first and second manifold installation openings 72*m*1,72*m*2 are adapted to receive part of the support block assembly 130 (specifically part of the lower support block 134) of the respective manifold fitting 50,52 therethrough such that the support block flow passages 136 lie respectively adjacent and communicate with the respective helical channels 66*a*,66*b*,66*c* so that the conduits C1,C2,C3 can be fluidically connected to the support block flow passages 136*a*,136*b*,136*c* as described above (the helical channels 66 and/or other heat spreader 60 can be notched or otherwise configured to accommodate receipt of part of the support block assembly 130 through the manifold installation openings 72*m*1,72*m*2). The support block assembly 130 includes a projecting saddle flange 146 that extends completely around its periphery. The saddle flange 146 can be formed as one piece with the lower support block 134 as shown in FIG. 7. The saddle flange 146 conforms to the cylindrical or other external shape of the heat spreader 60 and purge manifold 70. A gasket can be located between the saddle flange 146 and the outer surface of the purge manifold 70 so as to be compressed by saddle flange 146. The outer wrap 84 can at least partially cover the saddle flange 146 to retain the first and second manifold fittings 50,52 in the first and second manifold installation windows 72*m*1,72*m*2 and/or fasteners can be used to secure the manifold fittings 50,52 in their operative position by fastening the support block assembly 130 to the heat spreader 60 or another part of the heat spreader assembly 32.

The present disclosure has been described with reference to a number of embodiments. Modifications and alternations will occur to others upon reading and understanding the preceding disclosure. It is intended that the following claims be construed as including all such modifications and alterations to the fullest extent possible while maintaining the validity of the claims.

The invention claimed is:

1. An inline heater comprising:

a heater core, said heater core comprising:

a heat spreader assembly comprising:

a tubular heat spreader that extends axially along a longitudinal axis and that comprises an external surface, said heat spreader assembly comprising a fluid inlet and a fluid outlet;

at least one conduit that extends helically about said longitudinal axis of said tubular heat spreader between said fluid inlet and said fluid outlet to define a fluid heating flow path that is engaged with said tubular heat spreader and that fluidically connects said fluid inlet and said fluid outlet;

said heat spreader assembly further comprising an electrically operated heating element for heating the tubular heat spreader, wherein said at least one heat transfer channel comprises opposite first and second side walls and bottom wall, wherein said at least one conduit is in contact with said first and second side walls and said bottom wall; and a purge manifold that externally covers said tubular heat spreader and closes said at least one heat transfer channel such that purge passages are defined between the channel walls and the purge manifold around the at least one conduit.

2. The inline heater as set forth in claim 1, wherein said tubular heat spreader comprises at least one heat transfer channel that extends helically about said external surface, wherein said at least one conduit is seated in said at least one heat transfer channel.

3. The inline heater as set forth in claim 2, wherein said at least one heat transfer channel comprises a helical pitch that varies along said longitudinal axis of said tubular heat spreader.

4. The inline heater as set forth in claim 1, wherein said at least one conduit comprises multiple conduits and wherein said at least one heat transfer channel comprises multiple heat transfer channels, wherein said multiple conduits are respectively located in and extend along said multiple heat transfer channels.

5. The inline heater as set forth in claim 4, wherein said multiple heat transfer channels are nested with respect to each other and define a multi-helix structure in which said multiple heat transfer channels are coaxially arranged about the longitudinal axis of said tubular heat spreader and are axially offset respect to each other.

6. The inline heater as set forth in claim 5, wherein said multiple heat transfer channels comprise three heat transfer channels and wherein said multiple conduits comprise three conduits respectively seated in said three heat transfer channels.

7. The inline heater as set forth in claim 1, wherein said heat spreader comprises an internal space defined by said tubular heat spreader and wherein said heating element is located within said internal space.

8. The inline heater as set forth in claim 7, further comprising first and second end plugs that are respectively connected to and seal opposite first and second open ends of the internal space such that said heat spreader assembly is explosion resistant.

9. The inline heater as set forth in claim 7, wherein said heating element comprises a thin film heater element or a resistance heating element engaged with an inside surface of said tubular heat spreader that defines said internal space or located external to said internal space and externally surrounding the tubular heat spreader.

10. The inline heater as set forth in claim 9, wherein said heating element comprises a thin film heating element located in said internal space and that extends completely circumferentially around said inside surface of said tubular heat spreader and wherein said heat spreader assembly further comprises a collet assembly located in the internal space that urges said thin film heater element into intimate contact with said inside surface of said tubular heat spreader, said collet assembly comprising:

a spring rod;

a selectively radially expandable collet body through which said spring rod extends;

at least two collet rings coaxially positioned on the spring rod and engaged with the collet body;

a spring coaxially located about the spring rod and an adjustment nut threadably engaged with the spring rod, wherein said nut is adapted to be selectively threadably advanced on said spring rod for urging the at least two collet rings toward each other and compressing the spring such that the at least two collet rings urge the collet body radially outward.

11. The inline heater as set forth in claim 10, further comprising:

an outer polymeric load spreader located radially inward from the thin film heater element and extending circumferentially coextensively with said thin film heater element;

an inner metallic load spreader located radially inward from the outer polymeric load spreader and extending circumferentially coextensively with said thin film heater element;

wherein said collet assembly is engaged with said inner load spreader and urges said inner and outer load spreaders radially outward to press said thin film heater element into intimate contact with said inside surface of said tubular heat spreader.

12. The inline heater as set forth in claim 1, wherein the heat spreader assembly comprises a purge gas inlet and a purge gas outlet that are in fluid communication with said purge passages for selectively flushing a purge gas through said purge passage from said purge gas inlet to said purge gas outlet.

13. The inline heater as set forth in claim 12, wherein said purge manifold comprises a cylindrical body including first and second axially extending purge distribution channels that are in fluid communication with the purge passages, wherein said purge gas inlet fitting and said purge gas outlet fitting are in fluid communication with said first and second purge distribution channels.

14. The inline heater as set forth in claim 13, further comprising an outer wrap that externally covers said purge manifold to enclose the first and second purge distribution channels.

15. The inline heater as set forth in claim 14, wherein said fluid inlet comprises a first manifold fitting and said fluid outlet comprises a second manifold fitting, said first and second manifold fittings each comprising a support block assembly comprising multiple support block flow passages that are respectively connected in fluid communication with the multiple conduits.

16. The inline heater as set forth in claim 15, wherein said support block assembly comprises an upper support block connected to a lower support block, wherein said upper and lower support blocks are connected to capture said multiple conduits therebetween.

17. The inline heater as set forth in claim 16, wherein each support block flow passage comprises a seal retaining groove for retaining a seal that fluidically seals the respective conduit located in said support block flow passage to said support block assembly.

18. The inline heater as set forth in claim 15, wherein said purge manifold comprises first and second openings in which said first and second manifold fittings are respectively located.

19. The inline heater as set forth in claim 18, wherein said first and second manifold fittings each comprise a saddle flange that is engaged by said outer wrap.

20. The inline heater as set forth in claim 16, wherein said first and second manifold fittings each further comprise a manifold piece comprising one or more secondary flow passages that communicate with at least one of the support block flow passages, wherein said manifold piece comprises first and second retaining grooves and wherein said support block comprises first and second retaining flanges that are respectively received in the first and second grooves to operably connect the support block to the manifold piece.

21. The inline heater as set forth in claim 20, wherein said first and second retaining flanges are respectively provided on the upper and lower support blocks.

22. A heat spreader assembly for a liquid heater, said heat spreader assembly comprising:

a tubular heat spreader that extends axially along a longitudinal axis and that comprises an external surface;

at least one conduit that extends helically about said longitudinal axis of said heat spreader;

a fluid inlet and a fluid outlet fluidically connected by said at least one conduit such that a fluid heating flow path is defined by said at least one conduit between said fluid inlet and said fluid outlet;

an electrically operated heating element for heating the heat spreader;

said heat spreader comprising at least one heat transfer channel that extends helically about said external surface, wherein said at least one conduit is seated in said at least one heat transfer channel;

said at least one heat transfer channel comprising opposite first and second side walls and bottom wall, wherein said at least one conduit is in contact with said first and second side walls and said bottom wall;

a purge manifold that externally covers said heat spreader and closes said at least one heat transfer channel such that purge passages are defined between the channel walls and the purge manifold around the at least one conduit.

23. The heat spreader assembly as set forth in claim 22, wherein said heat spreader comprises a tubular structure comprising an internal space in which said heating element is located.

24. An inline heater comprising:

a heater core, said heater core comprising:

a heat spreader assembly comprising:

a tubular heat spreader that extends axially along a longitudinal axis and that comprises an external surface and an internal space defined by said tubular heat spreader;

a fluid inlet;

a fluid outlet;

at least one conduit that extends helically about said longitudinal axis of said tubular heat spreader between said fluid inlet and said fluid outlet to define a fluid heating flow path that is engaged with said tubular heat spreader and that fluidically connects said fluid inlet and said fluid outlet;

an electrically operated heating element for heating the tubular heat spreader, wherein said electrically operated heating element is located within said internal space; and first and second end plugs that are respectively connected to and seal opposite first and second open ends of the internal space such that said heat spreader assembly is explosion resistant.

25. The inline heater as set forth in claim 24, wherein said first and second end plugs are respectively threaded into and seal the opposite first and second open ends of the internal space.

* * * * *